Oct. 18, 1932. J. A. M. HAWADIER Re. 18,628

VALVE FOR WIRELESS TELEGRAPHY OR TELEPHONY

Original Filed July 13, 1925

Inventor

JAQUES A. M. HAWADIER

By

Attorney

Reissued Oct. 18, 1932

Re. 18,628

UNITED STATES PATENT OFFICE

JACQUES ANTOINE MARIE HAWADIER, OF PARIS, FRANCE, ASSIGNOR, BY MESNE ASSIGNMENTS, TO OLD COLONY TRUST COMPANY, A CORPORATION OF MASSACHUSETTS

VALVE FOR WIRELESS TELEGRAPHY OR TELEPHONY

Original No. 1,666,010, dated April 10, 1928, Serial No. 43,259, filed July 13, 1925, and in France August 2, 1924. Application for reissue filed October 15, 1928. Serial No. 312,710.

My invention relates to a valve of the kind used in wireless telegraphy or telephony, especially constructed with the object of utilizing alternating current from the town supply to heat the cathode.

With this object in view the single filament generally used in triode valves is substituted according to my invention by a tubular cathode the heating of which is ensured by the action of a central auxiliary filament branched upon the alternating current from the town supply. In order to avoid all contact of this auxiliary filament with the tubular sending cathode, the latter is mounted and supported upon a tubular part of refractory and insulating material. The cathode is moreover specially constructed with the object of ensuring a regular transmission.

The invention has further for its object a special mode of supporting the auxiliary filament and the tube carrying the cathode.

The appended drawing shows by way of example two different modes of construction of a valve made according to the present invention.

As will be seen the valve consists of a tubular cathode *a* carried upon a part also of tubular shape *b* made of a refractory insulating and homogeneous material such for instance as quartz. The cathode *a* which is designed for the sending off of electrons is constituted by a tube made of a metal such as tungsten or molybdenum acting as carrier for a layer of active substances capable of emitting at moderate temperatures or in the body of which the active substances are incorporated or mixed. The oxides or oxide mixtures studied by Wehnelt such for instance as calcium, barium, strontium or thorium oxides, etc., may be employed advantageously to constitute the active substances. The cathode is connected to the plate and grid circuits by the lead *c*.

The entire structure comprising parts *a* and *b* may therefore be considered as a hollow member adapted to emit electrons upon suitable thermal energization, as for example, by filament *d*.

The cathode formed in this manner is heated by a straight or helical auxiliary filament *d*, as shown, the emissive power of which in addition to that of the cathode will bring the latter to a degree of heat sufficient to produce an abundant emission of free electrons. The filament *d* will be branched on an alternating current, such for instance as the circuit of the town supply, by means of leads *e* and $e^1$.

The insulating cathode support *b* is kept centered around the auxiliary filament *d* by means of tubular parts *f* and $f^1$ of nickel for instance secured by pinching upon the leads *e* and $e^1$, these tubular parts serving thus to retain both ends of the auxiliary filament *d* in position. This arrangement has also for its object to enclose the central auxiliary filament in order to avoid a prejudicial emission of electrons by the latter.

The valve is completed in the usual manner by a grid *g* and a plate *h* connected with their respective circuits by the leads *i* and *j*.

Figure 1:
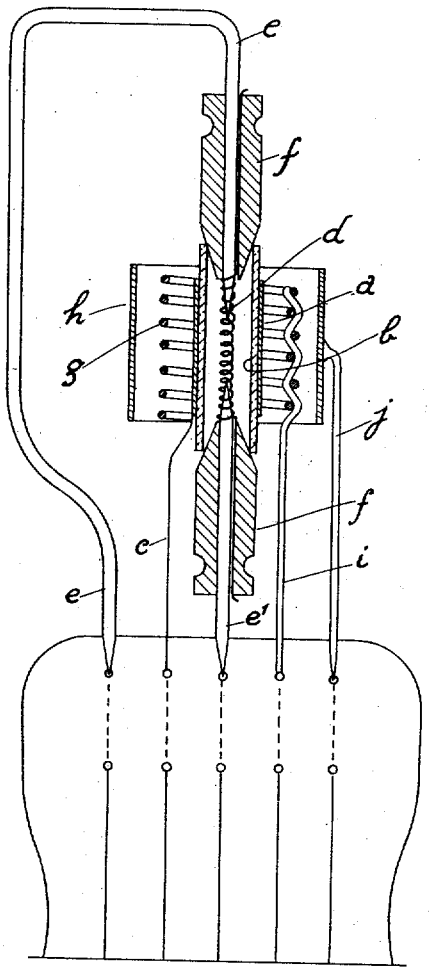
Fig. 1 is a diagram showing the general disposition.
Figure 2:
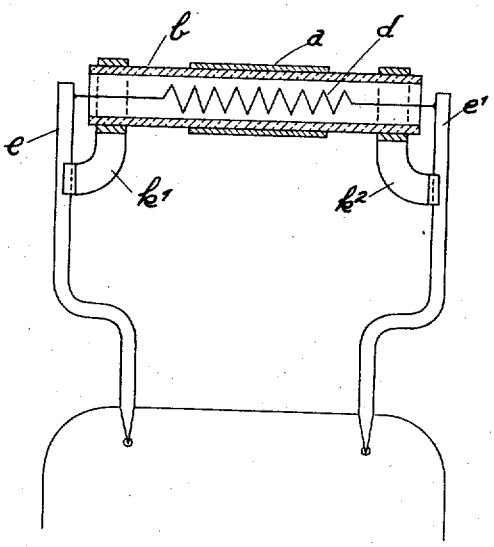
Fig. 2 shows separately the special supporting device for the auxiliary filament and the cathode tube.

In the mode of execution shown in Fig. 2 the cathode is placed horizontally. The auxiliary heating filament *d* secured to the leads *e*, $e^1$ is wound helically for part of its length only and in the middle in order to allow of heating the middle part of the quartz tube without putting the admissions of current in the interior of said tube. The latter is carried by means of supporting sleeves $k^1$, $k^2$ which are fixed by soldering to the current admissions and contribute to the cooling of the extremities of the quartz tube. The sleeves *k* are made of a refractory metal such for instance as molybdenum.

The cathode being formed by a rigid undeformable part it will be possible to bring the grid and plate nearer together without any risk of producing a short circuit caused by electrostatic attraction.

In the course of manufacture the occluded gases are completely evacuated from the different parts of the valve and necessary care should be taken during the pumping in order to avoid any formation of gas which might be prejudicial to the working of the valve.

I claim:

1. A valve for wireless telegraphy and telephony, comprising a metallic tubular cathode coated with electron emitting metallic oxides, an auxiliary heating filament in said cathode, conductors for supplying alternating current supporting the filament, a quartz tube between the filament and cathode, supporting the latter and projecting beyond the ends thereof, and collars at both ends of the quartz tube supporting the same and the said conductors.

2. A valve for wireless telegraphy and telephony comprising a grid, a plate, a tubular cathode coated with electron emitting oxides, an electrically non-conducting and heat transmitting tube longer than said cathode supporting the latter and projecting beyond its ends, a spiral heating filament in said tube solely in the middle part thereof, alternating current supply conductors for said filament and supporting the same, nickel collars supporting the ends of said tube and electrically connected to said conductors and supported thereby.

3. A cathode structure comprising a hollow member adapted to emit electrons upon suitable thermal energization, a heating filament within and spaced from said electron emitting member and means comprising at least one tapered member engaging one end of said electron emitting member for maintaining said heating member in desired relationship to said electron emitting member.

4. A cathode structure comprising a hollow insulating member having an equi-potential cathode surface, a heater, conducting members adapted to supply heating current to said heater, and a metal collar on at least one conducting member engaging said insulating member, whereby the said cathode surface and heater member are maintained in desired relation.

5. In a vacuum tube, an anode, a grid surrounded by said anode, a cathode structure surrounded by said grid and anode, said cathode structure comprising an equi-potential surface, a heater therefor, separated from said surface by a free space, conducting members for said heater and equi-potential surface, said conducting members comprising the sole means of support for said cathode structure, and means comprising metal collars fixedly secured on said conducting members for so supporting said equi-potential surface with respect to said conducting members and heater that an insulating surface is interposed between each collar and said equi-potential surface.

6. A cathode structure comprising a heating member, conducting members therefor, collars fixedly secured to said conducting members, a cylindrical member, adapted to function as an equi-potential cathode upon thermal energization, surrounding said heating member and between said collars, and insulating portions projecting beyond each end of said cylindrical member and extending to said metal collars, said metal collars, projecting insulating portions, and cylindrical member being so related to each other that said heating member, conducting members and cylindrical member are automatically maintained in desired relationship to each other.

7. In a thermionic tube having a hermetically sealed evacuated envelope, a cathode and cooperating electrodes entirely enclosed in said envelope, said cathode comprising a single hollow member adapted to emit electrons upon thermal energization thereof, members closing the ends of said hollow member and extending outwardly therebeyond, said closing members having reduced portions adapted to fit the ends of said hollow member, a conducting member extending through each of said closing members, and a heating filament inside said hollow member supported and energized by said conducting members.

8. In a thermionic tube having a hermetically sealed evacuated envelope, a cathode and cooperating electrodes entirely enclosed in said envelope, said cathode comprising a single hollow member adapted to emit electrons upon heating, plugs closing the ends of said hollow member and extending outwardly therebeyond, a conducting member extending through each of said plugs, a heating filament within said hollow member energized through said conducting members, and means for retaining said plugs in predetermined position on said conducting members.

9. In a thermionic tube having a hermetically sealed evacuated envelope, a cathode and cooperating electrodes entirely enclosed in said envelope, said cathode comprising a hollow elongated member having an external surface adapted to emit electrons upon heating, plugs closing the ends thereof and extending outwardly therebeyond, conducting members extending through the said plugs to the interior of the said hollow member, a heating filament in said hollow member for heating the same, lead-in members extending into said hollow member for supplying current to said filament, said plugs engaging said lead-in members and supporting said filament spaced from the inner walls of said hollow member.

10. A cathode structure comprising an equi-potential cathode surface, a hollow insulating member supporting said cathode surface, a heater, conducting members adapted to supply heating current to said heater, and a metal supporting member on at least one conducting member engaging said insulating member, whereby the said cathode surface and heater member are maintained in desired relation.

11. In a thermionic tube having a hermetically sealed evacuated envelope, a cathode and cooperating electrodes entirely enclosed in said envelope, said cathode comprising a single hollow member adapted to emit electrons upon suitable thermal energization, a heating member within said electron-emitting member, and a pair of plugs engaging the opposite ends of said hollow member, said heating member being supported between said plugs and held thereby spaced from said electron-emitting member.

In testimony whereof, I have hereunto subscribed my name this 29th day of September, 1928.

JACQUES ANTOINE MARIE HAWADIER.